United States Patent [19]

Krokonko

[11] 4,222,580
[45] Sep. 16, 1980

[54] REFUSE BAG HOLDER ASSEMBLY

[76] Inventor: Joseph Krokonko, 102 Robeson Dr., Coraopolis, Pa. 15108

[21] Appl. No.: 920,464

[22] Filed: Jun. 29, 1978

[51] Int. Cl.³ .............................................. B62B 1/00
[52] U.S. Cl. .................................. 280/47.34; 248/98; 280/79.1 A; 280/79.2
[58] Field of Search .............. 280/47.34, 47.37, 47.36, 280/79.1 R, 79.1 A, 79.2; 248/98, 97, 99, 101; 220/69, 403, 404

[56] References Cited

U.S. PATENT DOCUMENTS

| | | | |
|---|---|---|---|
| 2,917,769 | 12/1959 | Kasper | 280/79.1 A |
| 3,125,353 | 3/1964 | Gohmann | 280/79.2 |
| 3,554,573 | 1/1971 | Miller | 280/79.2 |
| 3,771,752 | 11/1973 | Meeh | 248/98 |
| 3,777,925 | 12/1973 | Eckholm | 220/404 |
| 4,130,261 | 12/1978 | Dow | 248/101 |

Primary Examiner—Robert R. Song
Attorney, Agent, or Firm—Paul Bogdon

[57] ABSTRACT

A holder assembly for use with refuse bags is disclosed. The assembly includes a dish-shaped base member supporting ground engaging wheels. A frusto-conically shaped bag support removably and snugly engages the base member. The bag support is sized such that its larger end engages the base member. It is also sized such that the closed end of a refuse bag will engage the base member while the open end of the bag extends out of the support so that the bag may be folded over to engage the upper end portion of the support. The lower end portion of the support is also sized such that a full refuse bag will not engage the inner lower portion of the support. A handle is provided on the base member for moving it on the wheels. A simple pin and slot type lock is provided on the support and base member.

3 Claims, 3 Drawing Figures

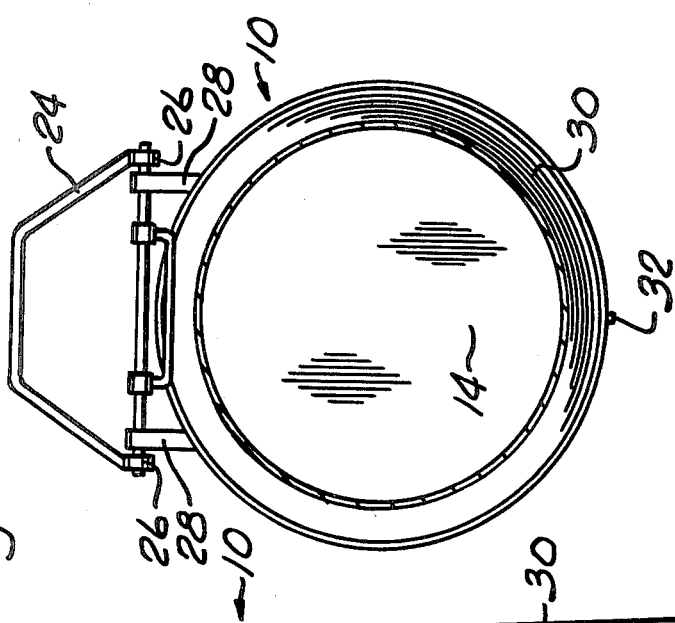
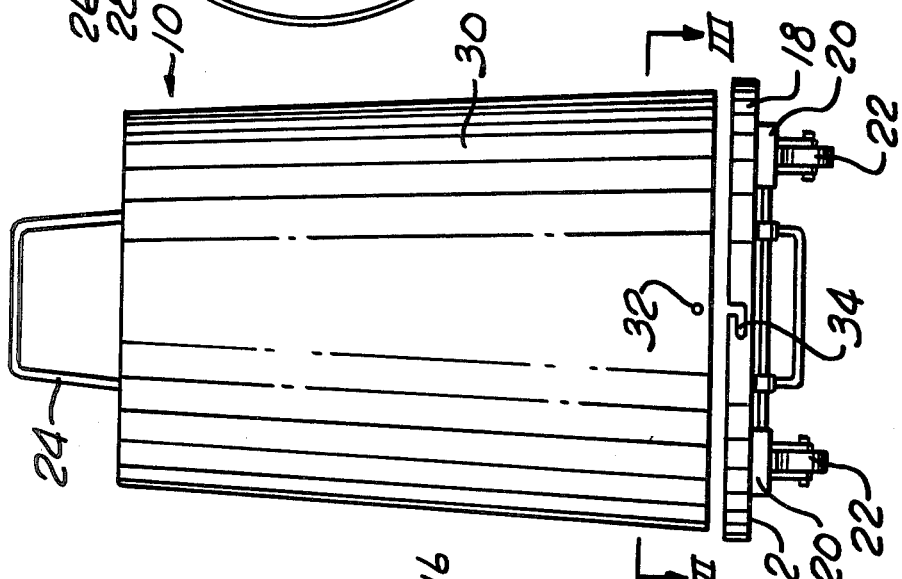
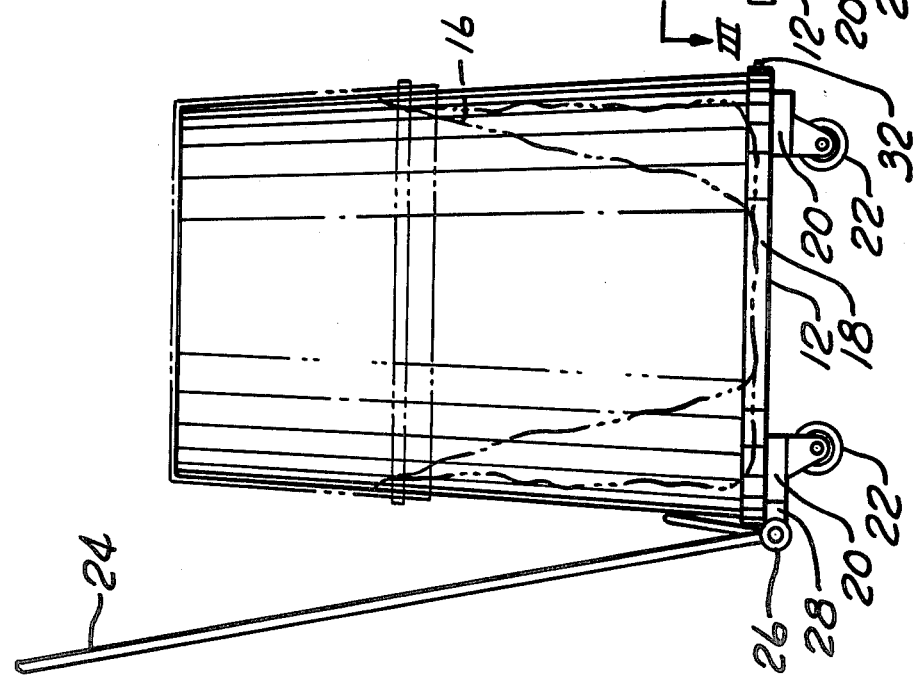

REFUSE BAG HOLDER ASSEMBLY

BACKGROUND OF THE INVENTION

This invention relates to a refuse bag holder assembly.

Plastic disposable refuse bags are now commonly used and have been for the past several years. Since the beginning of their use, various bag holders for assisting in filling the bags and transporting them have been designed and patents granted on those designs. For two typical designs reference is made to U.S. Pat. Nos. 3,771,752 and 3,898,699. Both holders disclosed in those patents are complex in their respective structures and would probably be necessarily expensive to manufacture. In addition, the bag holders are not easy to use because they require awkward clamping of the refuse bag to the holder structure. The refuse bag when filled would also tend to tear away from the clamps, particularly in the case of the holder of U.S. Pat. No. 3,771,752. Because of this more expensive heavier gage plastic bags would have to be used to avoid tearing.

The refuse bag holder of the present invention overcomes the above mentioned drawbacks of the known holder designs by providing a structure which is simple in its construction, relatively inexpensive to produce, easy to use, and avoids the need of heavier gage bags. In addition, the holder of this invention is portable and easily transported from place to place.

SUMMARY OF THE INVENTION

This invention provides a novel refuse bag holder assembly which in its preferred form comprises: a dish-shaped base member sized to support the closed end of a refuse bag; a frusto-conically shaped refuse bag support removably and snugly received on the base member with the larger end of the support being sized and shaped such that a refuse bag is removably received therein with the closed end of the bag extending outwardly of the upper end of the support enough to fold over to engage and be secured by an upper portion of the support, the support being further sized and shaped such that its lower section would not engage a filled refuse bag; and ground engaging wheels including castered wheels and a handle supported by the base for transporting the holder from place to place. The holder assembly may also include an arrangement for locking the bag support to the base member. One such locking arrangement is a pin-slot combination in which a pin is fixed to a lower edge of the support with an L-shaped slot provided in the upwardly extending flange of the base. The pin would be directed into the slot and the support rotated slightly to lock it to the base.

Various other advantages, details and modifications of the present invention will become apparent as the following description of a certain present preferred embodiment proceeds.

DESCRIPTION OF THE DRAWINGS

In the accompanying drawings I show a certain present preferred embodiment in which:

FIG. 1 is a side elevation view of a refuse bag holder assembly embodying the present invention showing in phantom outline a refuse bag both empty and filled;

FIG. 2 is a front elevation view of the bag holder of FIG. 1 showing the bag support removed from the base member; and FIG. 3 is a view taken along the line III—III of FIG. 1.

DESCRIPTION OF A PREFERRED EMBODIMENT

Referring now to the drawings, 10 generally represents a refuse bag holder assembly embodying the present invention. The assembly 10 includes a dish-shaped circular base member 12 having a generally flat main section 14 sized and shaped to support the closed end portion of a refuse bag 16. The main section 14 would be larger than the size of the bag 16 when it is filled with refuse. An upwardly extending flange 18 is integral with the periphery of the main section 14 of the base member 12.

Four identical pads 20 are secured in a generally rectangular pattern to the lower surface of the base member 12. Castered, ground engaging wheels 22 are suitably mounted to the pads 20. An upwardly extending U-shaped handle 24 is secured to the base member 12. The lower or open end of the handle 24 is fixed to a pair of limited movement pivot connectors 26 which in turn are mounted to bearing plates 28 secured to two of the pads 20. The handle 24 has a limited arc of movement and is easily grasped at a position convenient to a user for transporting the assembly 10 on its wheels 22 from place to place.

The base member 12 is sized and shaped to snugly and removably receive the large diameter end portion of a frusto-conically shaped bag support member 30. The support member 30 is in turn sized and shaped to receive a refuse bag within its confines such that the lower or closed end of the bag engages the main section 14 of the base member 12 while the upper or open end extends outwardly of the upper end of the support member enough to be folded over and engaged by the upper portion of the support member. The height of the support member 30 should be such that a sufficient amount of the bag 16 folds over and onto the support member such like is illustrated in FIG. 1. The lower portion of the support member 30 is sized such that a filled refuse bag does not engage its inner wall and a typical sizing of that sort is also illustrated in FIG. 1.

Locking means are provided for securing the support member 30 to the base member 12. As clearly shown in FIG. 2, a pin 32 is fixed to a lower end portion of the support member 30 and is sized to be slidably received in a generally L-shaped slot 34 formed in the flange 18 of the base member 12.

The support member 30 is aligned with the base member 12 so that the pin enters the open end of the slot 34, and the members are locked to each other by rotating the support member until the pin engages the closed end of the slot. A reverse rotation of the support member 30 orients it in an unlocked position with respect to the base member 12.

In using the bag holder assembly 10, a bag 16 is simply inserted into the support member 30 so that the closed end of the bag engages the base member 12. The open portion of the bag 16 is folded over the upper portion of the support member 30. Refuse may now be placed in the bag 16. When the bag 16 is filled, the entire assembly 10 may be transported to a desired place, the upper portion of the bag 16 taken off of the support member 30 and tied, and the support member unlocked from the base member 12, and removed from the base member. The filled bag 16 would be sitting on the base member 12 ready to be easily removed and placed at the desired location.

At this point, it should be quite clear how the advantages of the present invention as earlier described are realized. It should also be clearly understood that various mechanical modifications of the present invention are possible. For example, handles may be attached to the support member 30, all the wheels 22 need not be castered, and the handle 24 could be eliminated. It is also to be noted that the assembly 10 could be used without a refuse bag for receiving and transporting refuse such as grass clippings, leaves, weeds or the like. Also, it should now be appreciated that because a filled refuse bag is supported completely by the base member 12, there are no local strain areas such as would result when the bag is clamped. Thus, light weight bags may be used with this invention since there is no tendency of the bag to tear as is the case with the use of clamps.

While I have shown and described a certain present preferred embodiment of this invention, it is to be distinctly understood that the invention is not limited thereto, but may be otherwise embodied within the scope of the following claims.

I claim:

1. A holder assembly for refuse bags having open and closed ends, comprising:
   a generally dish-shaped base member for supporting the closed end of a refuse bag, said base member having an upwardly extending flange on its periphery and a solid bottom portion;
   frusto-conically shaped refuse bag support means removably supported by said base member with the larger end in engagement with said base member, said larger end being sized to snugly engage the inside of said flange, said bag support means being sized and shaped such that a refuse bag is removably received therein with the closed end of the bag engaging said solid portion of said base member and the open end portion of the bag extending outwardly of the upper end of the support means enough to fold over to engage and be secured by an upper portion of the support means, the support means being further sized and shaped such that the lower section of the support means would be out of engagement with a filled refuse bag;
   ground engaging transport means operatively supported by said base member; and
   locking means for selectively locking said bag support means to said base member, said locking means comprising said flange defining a generally L-shaped slot open at the upper lip section of the flange, and a pin member secured to the lower section of said bag support means and receivable within said slot whereby when said pin is initially inserted in said slot and the bag support means rotated the pin will follow the slot to its end and said bag support means and base member will be locked with respect to each other.

2. A holder assembly as set forth in claim 1 wherein said transport means includes an upwardly extending handle member for moving said base member.

3. A holder assembly as set forth in claim 1 wherein said transport means includes a plurality of ground engaging wheel members at least one of which is a castered wheel.

* * * * *